Nov. 26, 1929.   H. M. RASLER   1,737,022
ARM SIGNALING PANEL
Filed March 7, 1928
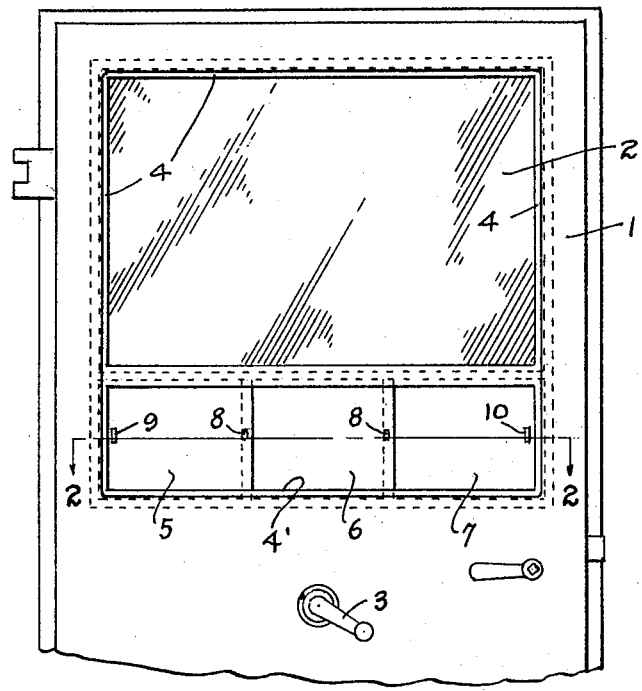
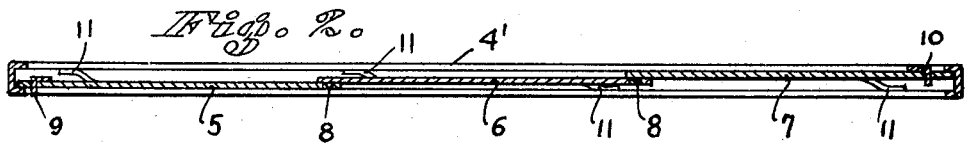
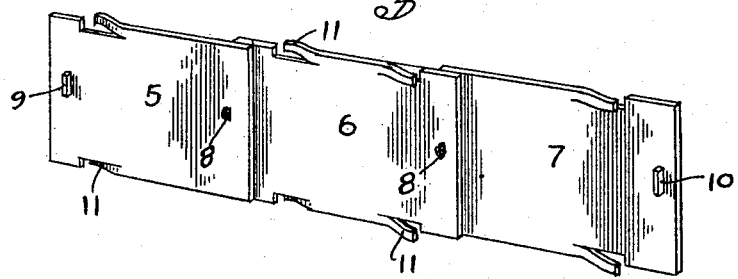
INVENTOR.
HARRISON M. RASLER
BY Miller & Boyken
ATTORNEYS.

Patented Nov. 26, 1929

1,737,022

UNITED STATES PATENT OFFICE

HARRISON M. RASLER, OF SAN FRANCISCO, CALIFORNIA

ARM SIGNALING PANEL

Application filed March 7, 1928. Serial No. 259,699.

This invention relates to arm signals as given by the driver of an automobile to indicate turning or stopping, and it has for its object improved construction of the door or window panel of a closed car whereby the arm of the driver may easily be extended when the window of the door is closed, as in cold, windy or rainy weather.

Briefly described, my invention comprises arranging one or more horizontally sliding panels, preferably two or three panels, within the glass-opening of a car window just above the window sill, so that they will slide one over the other to give any degree of opening desired, and preferably all substantially within the thickness of the glass sheet of the window so that they may be lowered with the glass sheet into the door slot like any automobile door light or glass.

In the drawings hereto Fig. 1 is a view of the upper part of the front door of a closed automobile at the driver's side with the front of the automobile pointed toward the right hand side of the drawing.

Fig. 2 is an enlarged section of Fig. 1 as seen from the line 2—2 thereof, and Fig. 3 is an enlarged perspective view of my sliding arm panels as tho removed from the glass frame but in their overlapping position as if closed as in Fig. 1.

In detail the drawings show a door 1 having the usual window opening glazed by a light or sheet of heavy glass 2 which is raised and lowered within the door by any suitable mechanism not shown, but operated by some suitable lever or hand crank as indicated at 3.

In this showing the glass sheet 2 is bound in a light metal frame 4 which is very little thicker than the glass itself so as to slide up and down in the door like a plain slab of glass, and this frame has an extension 4' below the glass so as to provide space for a plurality of slidable panels 5—6—7.

These panels or plates 5—6—7 are of thin sheet metal, preferably of non-corroding spring material, and they slide freely along grooves in the frame member.

When fully extended to completely cover the opening below the glass the panels overlap as shown best in Fig. 3 and with a slanted projection 8 in one plate fitting in a small opening in the overlapping plate so that the plates may freely be slid horizontally to either side of the frame opening but upon reverse mount the projections 8, or snap lugs, will snap into the openings and pull the central plate along to center it with reference to the opening and give a proper overlap to the plates to make them weather tight.

A low finger piece 9 on plate 5 serves for pushing the plates forward, and a similar piece 10 on plate 7 serves for pushing the plates rearwardly.

Finger piece 10 is a small piece of sheet metal bent at right angles and extending through a slot in plate 7 so that its portion lying flat on the plate and secured thereto will not interfere with telescoping of the plates together, while the inwardly projecting piece forms a stop against the right hand edge of plate 6 when the plates are slid to the left, and a similar construction of piece 9 provides a shoulder on the outside of plate 5 so that it will stop against the left hand edge of plate 6 when the plates are pushed to the right.

These plates 5—6—7 are thin so that when slid over one another they will still come substantially within the thickness of the glass sheet 4 and slide in a continuation of the groove in which the glass is seated.

To prevent rattling of the plates I preferably strike from their edges a few small spring strips as at 11 to bear against the sides of the frame groove yet of such flexibility that they do not interfere with sliding the plates over one another.

By the arrangement described it will be seen that a driver with window closed may quickly slide the plates in either direction to the extent desired for putting out his arm to give a signal, yet the window may be raised and lowered whether plates are in open or closed position, thus overcoming the fault of other devices of this kind wherein the inadvertent lowering of the glass would wreck the apparatus unless it was all properly adjusted before.

It will also be observed that the plates overlap like scales of a fish with reference to the travel of the machine so as to reduce to a minimum any leakage when driving at high speed into a rain or wind.

I claim:

1. In an automobile door provided with a window opening, a plurality of overlapping panels slidably mounted at the lower part of said opening to afford an arm signaling aperture, said panels comprising metal sheets and a snap lug on one sheet engageable with a pocket on the overlapping sheet whereby the minimum overlap is determined.

2. In an automobile door provided with a window opening, a plurality of overlapping panels slidably mounted at the lower part of said opening to afford an arm signaling aperture, and finger engageable means on one of said panels adapted for sliding of the same, grooved guides for the edges of said panels, and spring clips formed on the margins of the panels operative against the sides of the grooves.

3. In an automobile door provided with a window opening, a plurality of panels of sheet metal horizontally arranged in overlapping relation at the lower part of said opening, horizontally disposed grooved guides in which said panels are slidable, stops on the panels defining the minimum and maximum marginal overlap of the panels, and a finger grip for operating the panels.

HARRISON M. RASLER.